(12) United States Patent
Eiha et al.

(10) Patent No.: US 7,381,047 B2
(45) Date of Patent: Jun. 3, 2008

(54) MOLD

(75) Inventors: Noriko Eiha, Kanagawa (JP); Seiichi Watanabe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/581,447

(22) Filed: Oct. 17, 2006

(65) Prior Publication Data
US 2007/0087068 A1    Apr. 19, 2007

(30) Foreign Application Priority Data
Oct. 17, 2005 (JP) ............................. 2005-301143

(51) Int. Cl.
*B29C 45/26*   (2006.01)
*B29C 33/30*   (2006.01)

(52) U.S. Cl. .................. 425/469; 425/470; 425/418; 425/808; 425/352; 425/403

(58) Field of Classification Search ............... 425/418, 425/808, 168, 383, 398, 470, 469, 352, 403; 384/463, 491, 492
See application file for complete search history.

(56) References Cited

U.S. PATENT DOCUMENTS

| | | | | |
|---|---|---|---|---|
| 5,284,394 A * | 2/1994 | Lemelson | ................ | 384/463 |
| 6,357,923 B1 * | 3/2002 | Sato et al. | ................ | 384/492 |
| 2002/0174741 A1 * | 11/2002 | Kobayashi | ................ | 74/640 |
| 2004/0241448 A1 * | 12/2004 | Kano et al. | ................ | 428/408 |
| 2005/0082467 A1 * | 4/2005 | Mossman | ................ | 250/227.16 |
| 2005/0139455 A1 * | 6/2005 | Sykora | ................ | 198/853 |

FOREIGN PATENT DOCUMENTS

JP    2003-231159 A    8/2003

* cited by examiner

*Primary Examiner*—Steven P. Griffin
*Assistant Examiner*—Seyed Masoud Malekzadeh
(74) *Attorney, Agent, or Firm*—Sughrue Mion, PLLC

(57) ABSTRACT

A mold capable of preventing deterioration of the mold even when a material for spherical members is harder than that for the mold, and capable of aligning the center axis between an insert member and a body member thereof with high accuracy even when a pressure of resin filling is applied. The mold has an insert member with a cavity surface, and a body member for supporting the insert member from outside via a plurality of spherical members. Tubular liners harder than the spherical members are provided between the body member and the spherical members and between the insert member and the spherical members.

2 Claims, 3 Drawing Sheets

MOLD

BACKGROUND OF THE INVENTION

1. Field of the Invention

The present invention relates to a mold in which a body member supports an insert member having a cavity surface via a plurality of balls.

2. Description of the Related Art

A mirror frame which is a member for supporting an optical system for a digital camera or a telescopic lens requires an extremely high level of processing accuracy because such a mirror frame has a great influence on accuracy of an optical axis in the optical system. In addition, the accuracy of an optical axis is especially important to the performance and quality of a product. For instance, when ten lenses are used for an optical system, it has been common to manufacture a mirror frame one of whose lenses is designed to be fine-adjustable and, by fine-adjusting the lens, the optical axis can be finally adjusted. A small-sized mirror frame manufactured by means of plastic injection molding has been widely used as a mirror frame for supporting an optical system for a film camera with a lens, a cellular phone with a built-in camera, or the like. Further, a lens itself, constituting an optical system, has been formed by means of plastic injection molding, and the accuracy of an optical axis is highly important also in manufacturing such a lens.

As a mold capable of manufacturing a product with high accuracy, for example, a mold 500, as shown in FIG. 3, has been known which has a cavity between a first half 600 and a second half 700, and a product is injection-molded in the cavity (See, for example, Japanese Published Patent Application No. 2003-231159, paragraphs 0020-0029, FIG. 1). The first half 600 comprises an insert member 610 having a cavity surface 610a; a body member 620 for holding the insert member 610 from outside and having a tapered protrusion 621 on an end face thereof on the side of the second half 700; and a ball retainer 630 for intervening between the insert member 610 and the body member 620. Further, the second half 700 comprises an insert member 710 having a cavity surface 710a; a body member 720 for holding the insert member 710 from outside and having a reversely tapered part 721 on an end face thereof on the side of the first half 600; and a ball retainer 730 for intervening between the insert member 710 and the body member 720.

In the mold described above, the intervention of the ball retainers 630, 730 enables the center axis alignment between the insert member 610 and the body member 620 and between the insert member 710 and the body member 720 respectively, and, in the meantime, the use of the tapered protrusion 621 and the reversely tapered part 721 enables the center axis alignment between the first half 600 and the second half 700. In such a mold, a molded product is removed when the insert member 610 is moved with respect to the body member 620.

In the mold described above, in the meantime, there is a possibility that a track surface of the mold deteriorates in a case where a material for the spherical members is harder than that for the mold (an insert member and a body member thereof), because the spherical members roll between the insert member and the ball retainer or between the ball retainer and the body member every time a molded product is removed. There is another problem that, when the track surface of the mold is ground off, the resultant ground matters further grind off the mold, and the ground matters or ground irregularities misalign the spherical members to degrade the center axis alignment of the insert member. It is to be noted that the problems described above tend to occur easily, because, in general, such a mold is made of brass, aluminum, copper, a stainless steel product (HRC 33-52) plated with nickel or copper, or the like in consideration of easier processing, while in turn, the spherical members are made of bearing steel (HCR 58-64) or the like, which is harder than the former. To solve such a problem, if the material for a mold is designed to be harder than that for the spherical members, there occurs a problem that a mold is difficult to be machined to thereby raise the production cost, or that a desired processing accuracy of a molded product cannot be obtained using a harder material for the mold.

There is also a problem that, because the material for the mold described above is not sufficient in stiffness against a pressure applied when a molten resin is filled into a cavity, the spherical members are pushed (sunk) into the mold to degrade accuracy in the center axis alignment between the insert member and the body member.

For the reasons described above, an object of the present invention is to provide a mold capable of preventing deterioration of the mold even when the material for the spherical members are harder than that for the mold, and capable of aligning the center axis between the insert member and the body member with high accuracy even when the pressure of resin filling is applied thereon.

SUMMARY OF THE INVENTION

The present invention provides a mold comprising an insert member having a cavity surface; a body member for supporting the insert member from outside via a plurality of spherical members, and the mold is characterized in that a tubular protection member harder than the spherical members is provided at least either between the body member and the spherical members or between the insert member and the spherical members.

According to the present invention, for example, when tubular protection members harder than the spherical members are provided both between the body member and the spherical members and between the insert member and the spherical members, both the body member and the insert member are protected against the spherical members by the protection members, which thereby prevents deterioration of the mold. Namely, even when the material for the spherical members is harder than that for the mold (the body member and the insert member), the protection member harder than the spherical members can prevent deterioration of the mold. In addition, when the hard protection member is provided, stiffness against the pressure of molten resin filling becomes higher, so that the center axis can be aligned between the insert member and the body member with high accuracy even when the pressure of resin filling is applied, and the shape accuracy (the accuracy in the center axis alignment) can be also improved.

Further, it is preferable in the present invention that the protection member is fixed by means of shrink fitting on an inner circumferential face of the body member or an outer circumferential face of the insert member.

With this configuration, the use of the shrink fitting method can eliminate resistance which is otherwise generated when the protection member is fixed on the inner circumferential face of the body member or the outer circumferential face of the insert member, and can also improve the accuracy in the center axis alignment between the inner circumferential face of the body member or the outer circumferential face of the insert member and the protection member, because the inner circumferential face of the body member or the outer circumferential face of the insert member and the protection member are fixed together so that they gradually come to fit to each other during heat contraction.

Further, it is preferable in the present invention that the protection member is formed by means of coating on the inner circumferential face of the body member or the outer circumferential face of the insert member.

The "coating" as described herein includes, but is not especially limited to, the wet process such as plating and other coating methods, the dry process such as the physical vapor deposition (PVD) and the chemical vapor deposition (CVD), and the like.

With this configuration, the coating allows various hard materials (for example, DLC, TiN, TiC, CrC, or the like) to be used as a protection member, so that even a hard material which cannot be employed in the shrink fitting method (namely, which cannot be processed into a tubular shape) can be used, enabling to achieve even higher stiffness of the protection member.

In the dry process, the center axis alignment between the body member and the insert member can be secured with high accuracy because it is possible to uniformly control the coating thickness in nanometers. In contrast, in the wet process, it is sometimes difficult to obtain a uniform coating thickness, however, in that case, the body member or the insert member is subjected to the coating, and then to the processing, which secures the center axis alignment.

DETAILED DESCRIPTION OF EXEMPLARY EMBODIMENT

Figure 1:
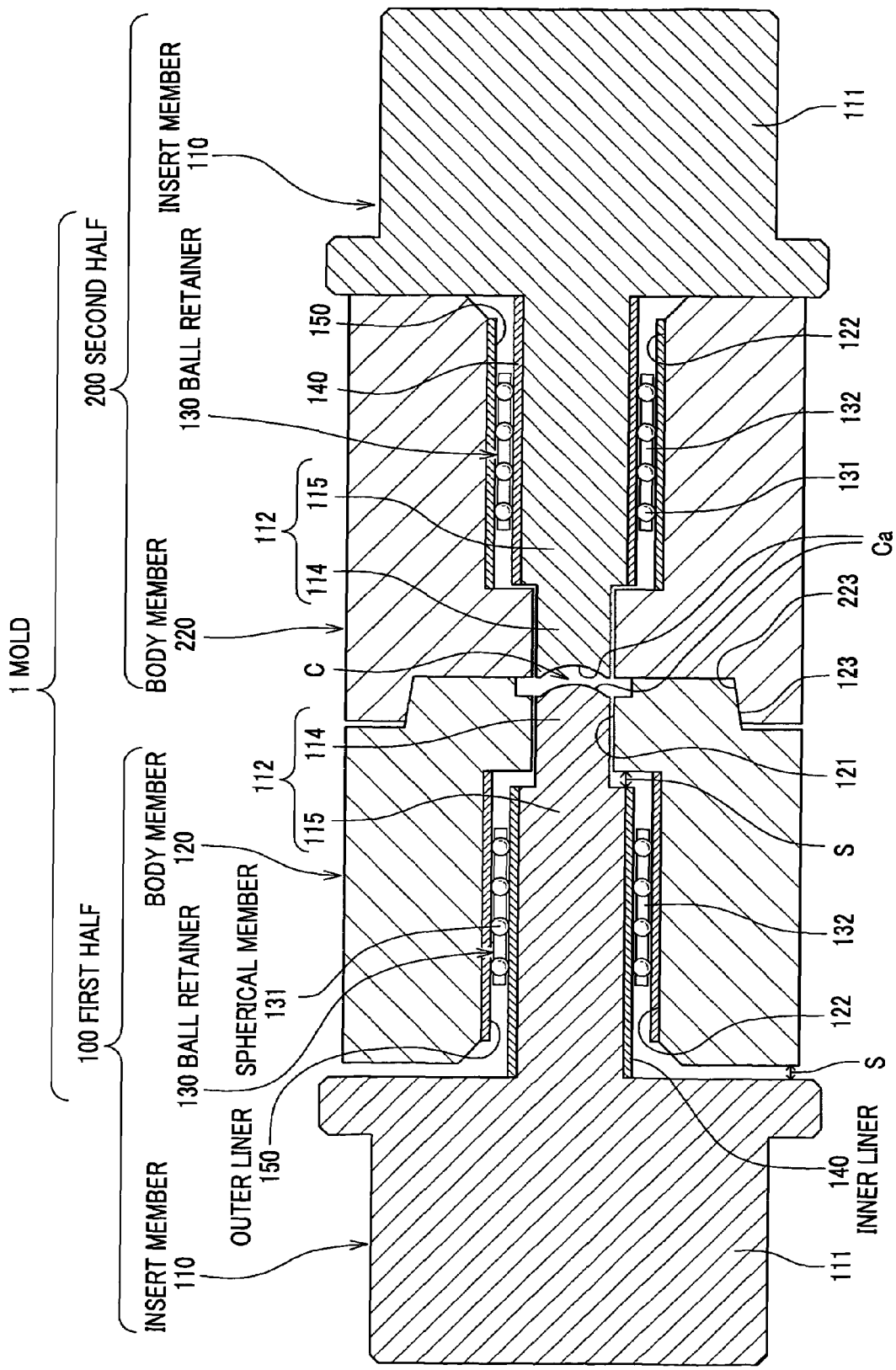
FIG. 1 is a cross sectional view showing an entire mold according to an embodiment of the present invention.

An embodiment of the present invention is described next in detail with reference to the related drawings according to the necessity. In the drawings to be referred to, FIG. 1 is a cross sectional view showing an entire mold according to the embodiment.

As shown in FIG. 1, a mold 1 has a cavity C between a first half 100 and a second half 200, and an optical lens L as a molded product is manufactured by feeding a molten resin into the cavity C. The cavity C is configured to communicate with a spool or a gate (not shown) as a pathway for the molten resin. The first half 100 and the second half 200 are attached on the movable side and the fixed side, respectively, of an injection molder not shown, and the first half 100 is provided dismountably (movably in the axial direction) with respect to the second half 200.

The first half 100 mainly comprises an insert member 110 with a cavity surface Ca modeling a shape of one of the two lens surfaces (a portion of a molded product) of the optical lens L formed at a tip thereof; and a body member 120 capable of fitting the insert member 110 thereinto, and a ball retainer 130 is provided between the insert member 110 and the body member 120.

The insert member 110 is a brass member, which is configured separately from the body member 120, and comprises an insert member body 111 formed in a substantially tubular shape; and a shaft 112 extending from the center on one end side (on the right side in FIG. 1) of the insert member body 111.

The insert member body 111 is formed to have a larger diameter than a thick hole 122 of the body member 120 described hereinafter, and thereby a face on the one end side thereof can abut on a face on the other side (on the left side in FIG. 1) of the body member 120.

The shaft 112 is a member to fit in with the body member 120, and, in this embodiment, comprises a small diameter part 114 in a cylindrical shape with a cavity surface Ca provided on one end side thereof; and a large diameter part 115 in a cylindrical shape formed in succession to the other side of the small diameter part 114 and having a diameter larger than that of the small diameter part 114. An inner liner (a protection member) 140 in a cylindrical shape made of a material harder than that of spherical members 131 described hereinafter is fixed on an outer circumferential surface of the large diameter part 115 by means of shrink fitting. The material for the inner liner 140 is not especially limited herein, as long as the material is harder than that of the spherical members 131 described hereinafter, and, for example, tool steel (high-speed steel: HRC 70 or more) and cemented carbide (HRC 65 or more) may be used. Thickness of the inner liner 140 is preferably 0.3-3 mm, and more preferably, 1-1.5 mm.

The body member 120 is a member made of stainless steel (quenched and tempered steel) for holding the insert member 110 from outside, and has a cylindrical shape with a hollow (a through hole) provided in the central part thereof. The hollow in the body member 120 comprises a thin hole 121 into which the small diameter part 114 of the insert member 110 is fitted; and a thick hole 122 for loosely fitting with the large diameter part 115 of the insert member 110. Further, a tapered protrusion 123 in the shape of a circular truncated cone is provided on one end side of the body member 120, enabling the center axis alignment with the second half 200.

Figure 2:
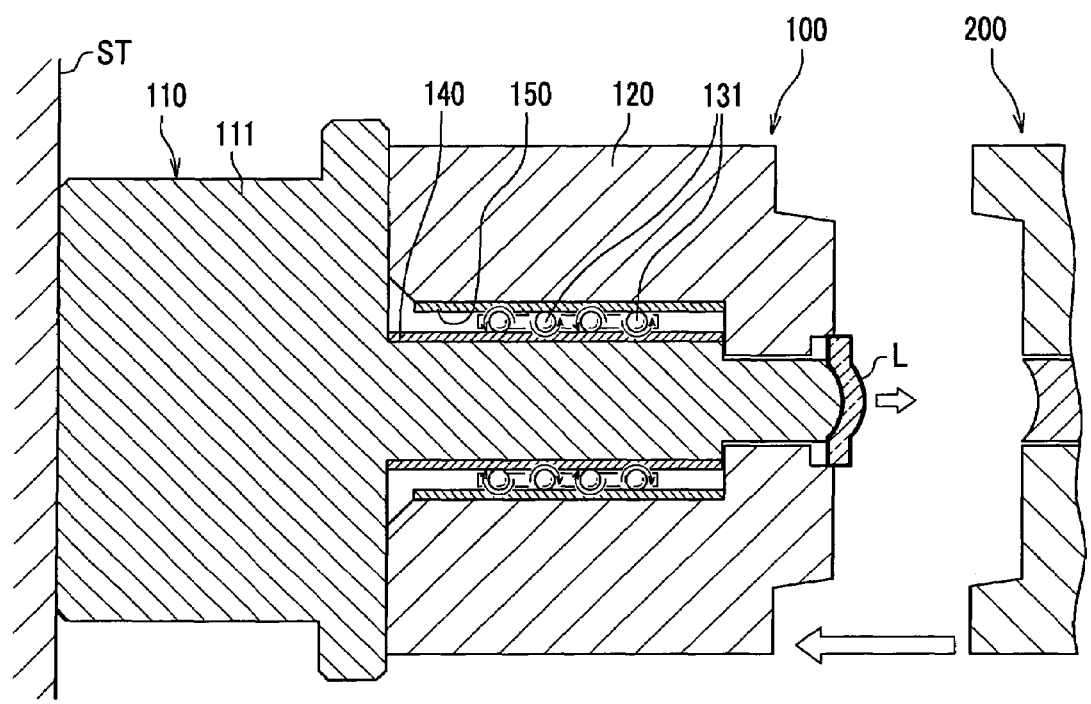
FIG. 2 is an enlarged cross sectional view showing a mold in an opened state according to the embodiment.
Figure 3:
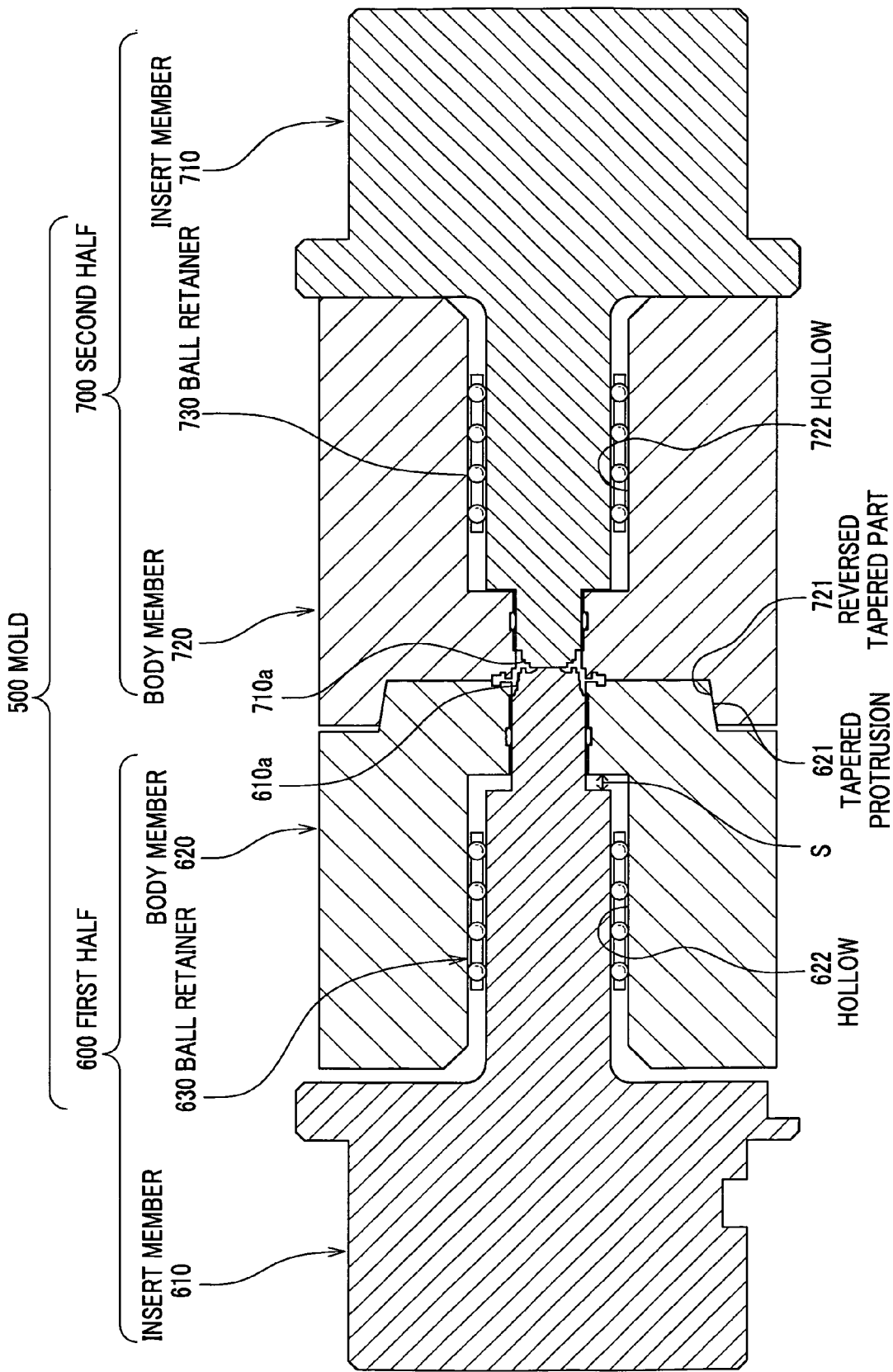
FIG. 3 is a cross sectional view showing an entire mold according to the conventional technology.

The diameter of the thin hole 121 is formed to be substantially the same as or slightly larger than the small diameter part 114 of the insert member 110. Specifically, the thin hole 121 is preferably formed to be larger than the small diameter part 114 by about 10-30 μm in diameter (by about 5-15 μm in radius), and more preferably, by about 10-20 μm in diameter (by about 5-10 μm in radius). Further, one end side of the thin hole 121 opens on one end side of the body member 120, which makes it possible for the cavity surface Ca formed on one end side of the small diameter part 114 to be exposed on a face on one end of the body member 120, when the small diameter part 114 of the insert member 110 is fitted into the thin hole 121. It is to be noted that, to eject the optical lens L out of the cavity surface Ca, the insert member 110 and the body member 120 are provided so that, as shown in the figure, a space S is created each between a face on one end side of the large diameter part 115 and a bottom face on one end side of the thick hole 122 and between a face on one end side of the insert member body 111 and a face on the other side of the body member 120. With this configuration, as shown in FIG. 2, after the first half 100 separates from the second half 200, an ejector plate ST pushes the insert member 110 to thereby protrude the cavity surface Ca to eject the optical lens L as a molded product.

An outer liner (a protection member) 150 made of the same material as that of the inner liner 140 described above is fixed by means of shrink fitting on an inner circumferential surface of the thick hole 122. A space between the inner liner 140 and the outer liner 150 is created to have the size same as or slightly smaller than the diameter of each spherical member 131 in the ball retainer 130. With this configuration, the body member 120 can support the insert member 110 movably in the axial direction thereof via a plurality of spherical members 131 provided in the ball retainer 130. The other side of the thick hole 122 opens on an end face on the other side of the body member 120, into which the shaft 112 of the insert member 110 can be inserted. One end side of the thick hole 122 is communicated with the other end side of the thin hole 121.

The ball retainer 130 is a member for intervening between the body member 120 and the insert member 110 to support the insert member 110 and to achieve the center axis alignment thereof, and comprises a plurality of spherical members 131; and a cylindrical supporting body 132 for rotatably supporting the spherical members 131.

Each of the spherical members 131 is made of a material harder than that of the insert member 110 or the body member 120 described above, namely, for instance, bearing steel (hardness: HRC 58), stainless steel (SUS440, hardness: HRC 56), or the like. In this embodiment, however, the liners 140, 150 made of a material harder than that of the spherical members 131 described above (for example, tool steel) are provided between the spherical members 131 and the insert member 110 and between the spherical members 131 and the body member 120, which prevents the insert member 110 and the body member 120 from being ground off by the spherical members 131 harder than the insert member 110 and the body member 120.

In addition, the members which directly contact with the spherical members 131 are the liners 140, 150 each made of a material harder than the mold (namely, the insert member 110 and the body member 120), so that stiffness against the pressure applied during resin filling is improved, and the shape accuracy, more specifically, the accuracy in the center axis alignment of the optical lens L is also improved.

Each of the spherical members 131 is formed to have a diameter substantially the same as or slightly larger than the space between each of the liners 140, 150. Specifically, the diameter of each spherical member 131 is preferably larger than the space described above by about 1-6 μm, and more preferably, by about 1-3 μm. With this configuration, any of the spherical members 131 and each of the liners 140, 150 is provided in the space between each of the liners 140, 150 in the state of being elastically pressed and deformed, allowing the restoring force of the spherical members 131 to act as pressurization to firmly support the insert member 110.

The supporting body 132 has a plurality of supporting holes each for rotatably supporting the spherical members 131, and, because the spherical members 131 supported by respective supporting holes protrude from the outer circumferential surface and the inner circumferential surface of the supporting body 132 to roll on each of the liners 140, 150, the insert member 110 moves freely with respect to the body member 120.

The second half 200 has the same configuration as that of the first half 100 except that the second half 200 has, on an end face on the other side (on the left side in FIG. 1) of the body member 220, a reversely tapered part 223 fitted with the tapered protrusion 123 of the body member 120 of the first half 100, and except that the second half 200 does not have any space S, like that in the first half 100, between the insert member 110 and the body member 220 but they are closely attached to each other, because no ejection mechanism is necessary. It is to be noted that the same reference numerals are assigned to the same components of the second half 200 as those of the first half 100, and the descriptions thereof are omitted herefrom.

According to the description above, the following advantages can be obtained in this embodiment.

The mold (the body member 120 and the insert member 110) is protected against the spherical members 131, because the tubular liners 140, 150 harder than the spherical members 131 are provided both between the body member 120 and the spherical members 131 and between the insert member 110 and the spherical members 131, so that it is possible to prevent the mold from deteriorating even when the material for the spherical members 131 is harder than that for the mold.

The members which directly contact with the spherical members 131 are the liners 140, 150 harder than the mold (namely, the insert member and the body member 120), so that the stiffness against the pressure applied during resin filling is improved, and the shape accuracy, more specifically, the accuracy in the center axis alignment of the optical lens L can be improved.

With the advantages described above, the mold (the body member 120 and the insert member 110) is protected against the spherical members 131 by means of the protection members (liners 140, 150), so that any material can be used as a material for the mold as long as the material can be generally used as a material for a mold. It is to be noted that there is a variety of materials which can be used as a material for a mold, however, only limited types of materials are available for a mold which requires processing with ultra-high accuracy such as a mold for a mirror plane. Moreover, it is not desirable that the types of the available materials are further limited owing to the use of the support with spherical members. In consideration of the above, it is highly preferable that, as in the present invention, a protection member is provided in a mold, and thereby the material to be used in the mold is not limited owing to the use of the spherical members.

In this embodiment, the use of the shrink fitting method makes it possible to eliminate resistance which is otherwise generated when each of the liners 140, 150 is fixed onto an outer circumferential face of the insert member 110 or an inner circumferential face of the body member 120, and also makes it possible to fix the outer circumferential face of the insert member 110 or the inner circumferential face of the body member 120 and each of the liners 140, 150 so that they gradually come to fit with each other during heat contraction. For the reasons described above, the accuracy in the center axis alignment between the outer circumferential face of the insert member 110 and the inner liner 140, or that between the inner circumferential face of body member 120 and the outer liner 150 can be improved.

In a case where heating during shrink fitting releases stress to cause deformation, the outer liner 150 may be shrink-fitted inside the body member 120, and then the tapered protrusion 123 (or the reversely tapered part 223) and the liner inner wall may be processed to improve the accuracy in the center axis alignment.

Similarly, in a case where heating during shrink fitting releases stress to cause deformation, the inner liner 140 may be shrink-fitted in the insert member 110, and then the small diameter part 114, the cavity surface Ca, and the liner outer wall may be processed to improve the accuracy in the center axis alignment.

Liners 140, 150 are provided also on the insert member 110 and the body member 220 of the second half 200, like the first half 100, so that it is possible to prevent the mold from being ground off when each of the spherical members 131 and the body member 220 or the insert member 110 are rubbed to each other when the insert member 110 is loaded into the body member 220. For reference, the second half 200 may not have a supporting body 132 for rotatably holding the spherical members 131, because, unlike the first half 100, the second half 200 does not have the configuration in which the insert member 110 and the body member 120 frequently move relative to each other (namely, the optical lens L can be ejected out of the molded-product-forming face).

The present invention is carried out in various embodiments without being limited to the embodiment described above.

In the embodiment described above, the liners 140, 150 are provided both between the body member 120 and the spherical members 131 and between the insert member 110 and the spherical members 131, however, the present invention is not limited to this configuration. The liners 140, 150 may be provided only either between the body member 120 and the spherical members 131 or between the insert member 110 and the spherical members 131. With this configuration, deterioration in either the insert member 110 or the body member 120 can be prevented, and thereby deterioration in the entire mold can be prevented. It is to be noted that, in a case where a liner is provided only in any one of the insert member 110 and the body member 120, it is preferable that the material for the one not provided with the liner has hardness similar to that of the liner.

In the embodiment described above, the present invention is applied to the configuration in which the ball retainer 130 comprising the spherical members 131 and the supporting body 132 is provided between the insert member 110 and the body member 120, however, the present invention is not limited to this configuration, and the present invention can be applied to the configuration in which, for example, only the spherical members are provided between the insert member 110 and the body member 120.

In the embodiment described above, the present invention is applied to the mold for manufacturing the optical lens L, however, the present invention is not limited to this configuration, and the present invention can be applied to a mold for manufacturing a high-accuracy product which requires high-level center axis alignment, such as, for example, a mirror frame for supporting an optical lens.

In the embodiment described above, the first half 100 and the second half 200 are attached on the movable side and on the fixed side respectively, of an injection molder not shown, however, the present invention is not limited to this configuration, and the first half 100 having an ejection mechanism may be attached on the fixed side.

In the embodiment described above, the spherical members are made of bearing steel, stainless steel, or the like, however, the present invention is not limited to this configuration, and the spherical members may be commercially-available bearing balls including ceramic bearing balls.

In the embodiment described above, the mold is made of brass and stainless steel, however, the present invention is not limited to this configuration, and the mold may be made of the materials generally used for a mold, such as aluminum, copper, various steel products, and the like. Such a member made of those materials may have various coatings (such as plating for high accuracy processing and an oxidation resistant layer).

In the embodiment described above, the liner is fixed by means of shrink fitting, however, the present invention is not limited to this configuration, and, for example, the liner may be formed by means of coating. The coating as described herein is not especially limited, but includes the wet process such as plating and other coating methods, the dry process such as the physical vapor deposition (PVD) method and the chemical vapor deposition (CVD) method, and the like. With this configuration, the coating allows various hard materials (for example, DLC, TiN, TiC, CrC, or the like) to be used as a protection member, so that even a hard material which cannot be employed in shrink fitting (namely, which cannot be processed into a tubular shape) can be used, enabling the stiffness of the protection member to be even higher.

In the dry process, a high accuracy in the center axis alignment between the body member and the insert member can be secured because it is possible to control a uniform coating thickness in nanometers. In contrast, in the wet process, it is sometimes difficult to achieve a uniform coating thickness, however, in that case, the body or the insert member is subjected to the coating, and then to the processing, which secures the accuracy in the center axis alignment.

The invention claimed is:

1. A mold comprising:
an insert member having a cavity surface; and
a body member for supporting the insert member from outside via a plurality of spherical members disposed between the insert member and the body member,
wherein a tubular protection member harder than the spherical members is provided at least either between the body member and the spherical members or between the insert member and the spherical members, and
wherein said spherical members are made of a material harder than that of said insert member and said body member.

2. A mold comprising:
an insert member having a cavity surface; and
a body member for supporting the insert member from outside via a plurality of spherical members disposed between the insert member and the body memory,
wherein a tubular protection member harder than the spherical members is provided at least either between the body member and the spherical members or between the insert member and the spherical members,
wherein the protection member is a coating on both an inner circumference face of the body member and also an outer circumferential face of the insert member, and
wherein said spherical members are made of a material harder than that of said insert member and said body member.

* * * * *